(12) United States Patent
Yamada et al.

(10) Patent No.: US 11,118,757 B2
(45) Date of Patent: *Sep. 14, 2021

(54) LIGHT EMITTING DEVICE

(71) Applicant: NICHIA CORPORATION, Anan (JP)

(72) Inventors: Motokazu Yamada, Tokushima (JP); Takeshi Tamura, Tokushima (JP); Hiroshi Fujimori, Chino (JP)

(73) Assignee: NICHIA CORPORATION, Anan (JP)

( * ) Notice: Subject to any disclaimer, the term of this patent is extended or adjusted under 35 U.S.C. 154(b) by 80 days.

This patent is subject to a terminal disclaimer.

(21) Appl. No.: 16/696,494

(22) Filed: Nov. 26, 2019

(65) Prior Publication Data

US 2020/0096175 A1 Mar. 26, 2020

Related U.S. Application Data

(63) Continuation of application No. 15/705,057, filed on Sep. 14, 2017, now Pat. No. 10,527,257.

(30) Foreign Application Priority Data

Sep. 16, 2016 (JP) .................................. 2016-182079

(51) Int. Cl.
*G02F 1/13357* (2006.01)
*F21V 7/22* (2018.01)
(Continued)

(52) U.S. Cl.
CPC .............. *F21V 7/22* (2013.01); *F21V 7/0083* (2013.01); *F21V 9/30* (2018.02); *F21V 13/08* (2013.01);
(Continued)

(58) Field of Classification Search
None
See application file for complete search history.

(56) References Cited

U.S. PATENT DOCUMENTS 9,299,895 B1* 3/2016 Hsing Chen ............ H01L 33/54
9,939,680 B2* 4/2018 Cho ...................... G02B 5/0257
(Continued)

FOREIGN PATENT DOCUMENTS

DE  10 2013 215 112 A1  2/2014
JP     2003-222864 A    8/2003
(Continued)

OTHER PUBLICATIONS

Final Office Action on U.S. Appl. No. 15/705,057, dated Apr. 17, 2019.
(Continued)

*Primary Examiner* — Andrew J Coughlin
(74) *Attorney, Agent, or Firm* — Foley & Lardner LLP

(57) ABSTRACT

A light emitting device includes: a mounting board; a plurality of light sources positioned on the mounting board; a light diffusion plate; a half mirror positioned between the light diffusion plate and the plurality of light sources; and a plurality of diffuse reflectors positioned between the mounting board and the light diffusion plate, and above at least part of each emission face of the plurality of light sources. The diffuse reflectors comprise a resin, and particles dispersed in the resin. Each of the diffuse reflectors is positioned in an area that, in the top view, is larger than and includes the emission face of each light source. A density of the particles in said area, in the top view, is higher in a first portion located immediately above the emission face of each light source than in a second portion located around a periphery of the first portion.

15 Claims, 9 Drawing Sheets

(51) Int. Cl.
  *F21V 9/30* (2018.01)
  *F21V 7/00* (2006.01)
  *F21V 13/08* (2006.01)
  *G02F 1/1335* (2006.01)
  *F21Y 115/30* (2016.01)
  *F21Y 105/16* (2016.01)
  *F21Y 115/10* (2016.01)

(52) U.S. Cl.
  CPC .. *G02F 1/133603* (2013.01); *G02F 1/133605* (2013.01); *G02F 1/133606* (2013.01); *G02F 1/133611* (2013.01); *F21Y 2105/16* (2016.08); *F21Y 2115/10* (2016.08); *F21Y 2115/30* (2016.08); *G02F 1/133557* (2021.01); *G02F 1/133614* (2021.01)

(56) References Cited

U.S. PATENT DOCUMENTS

| | | | |
|---|---|---|---|
| 10,527,257 B2* | 1/2020 | Yamada | F21V 7/0083 |
| 2006/0290842 A1 | 12/2006 | Epstein et al. | |
| 2009/0225543 A1* | 9/2009 | Jacobson | G02B 27/095 |
| | | | 362/247 |
| 2010/0046234 A1* | 2/2010 | Abu-Ageel | G02B 3/0006 |
| | | | 362/308 |
| 2010/0187975 A1 | 7/2010 | Tsukahara et al. | |
| 2010/0265694 A1* | 10/2010 | Kim | G02B 6/0068 |
| | | | 362/97.1 |
| 2011/0309398 A1 | 12/2011 | Ito et al. | |
| 2012/0218752 A1 | 8/2012 | Sumitani | |
| 2012/0327330 A1* | 12/2012 | Takahashi | G02B 5/0221 |
| | | | 349/61 |
| 2015/0043198 A1* | 2/2015 | Hwang | G02B 5/208 |
| | | | 362/97.4 |
| 2016/0070137 A1 | 3/2016 | You et al. | |

FOREIGN PATENT DOCUMENTS

| | | |
|---|---|---|
| JP | 2006-310042 A | 11/2006 |
| JP | 2006-310045 A | 11/2006 |
| JP | 2008-218312 A | 9/2008 |
| JP | 2008-282744 A | 11/2008 |
| JP | 2010-170961 A | 8/2010 |
| JP | 2012-059988 A | 3/2012 |
| JP | 2012-174371 A | 9/2012 |
| JP | 2012-174634 A | 9/2012 |
| JP | 2012-212509 A | 11/2012 |
| WO | WO-2012-023459 A1 | 2/2012 |

OTHER PUBLICATIONS

Non-Final Office Action on U.S. Appl. No. 15/705,057 dated Oct. 4, 2018.

Notice of Allowance on U.S. Appl. No. 15/705,057 dated Aug. 30, 2019.

Notice of Allowance on U.S. Appl. No. 15/705,057 dated Nov. 7, 2019.

* cited by examiner

LIGHT EMITTING DEVICE

CROSS-REFERENCE TO RELATED APPLICATIONS

This application is a continuation of U.S. patent application Ser. No. 15/705,057, filed Sep. 14, 2017, which claims priority to Japanese Patent Application No. 2016-182079, filed on Sep. 16, 2016, the disclosures of which are hereby incorporated by reference in their entireties.

BACKGROUND

The present disclosure relates to a light emitting device. Direct-backlit light emitting devices using semiconductor light emitting elements have been proposed as backlights for use in display devices, such as liquid crystal display devices. For example, Japanese Unexamined Patent Application Publication Nos. 2012-174371 and 2012-212509 disclose light emitting devices including a plurality of light emitting diodes (LEDs) arranged in an array and a reflector combined with a half mirror whose reflectance is controlled in part.

SUMMARY

For direct-backlit type light emitting devices, a reduction of the non-uniform luminance of the light sources is desirable. Certain exemplary embodiments of the present disclosure can provide a light emitting device with reduced non-uniform luminance.

A light emitting device according to one embodiment includes: a mounting board; a plurality of light sources positioned on the mounting board; a light diffusion plate; a half mirror positioned between the light diffusion plate and the plurality of light sources of the mounting board; and a plurality of diffuse reflectors positioned between the mounting board and the light diffusion plate, and above at least part of each emission face of the plurality of light sources.

According certain embodiments of the present disclosure, a light emitting device with reduced non-uniform luminance can be provided.

DETAILED DESCRIPTION

Figure 1:
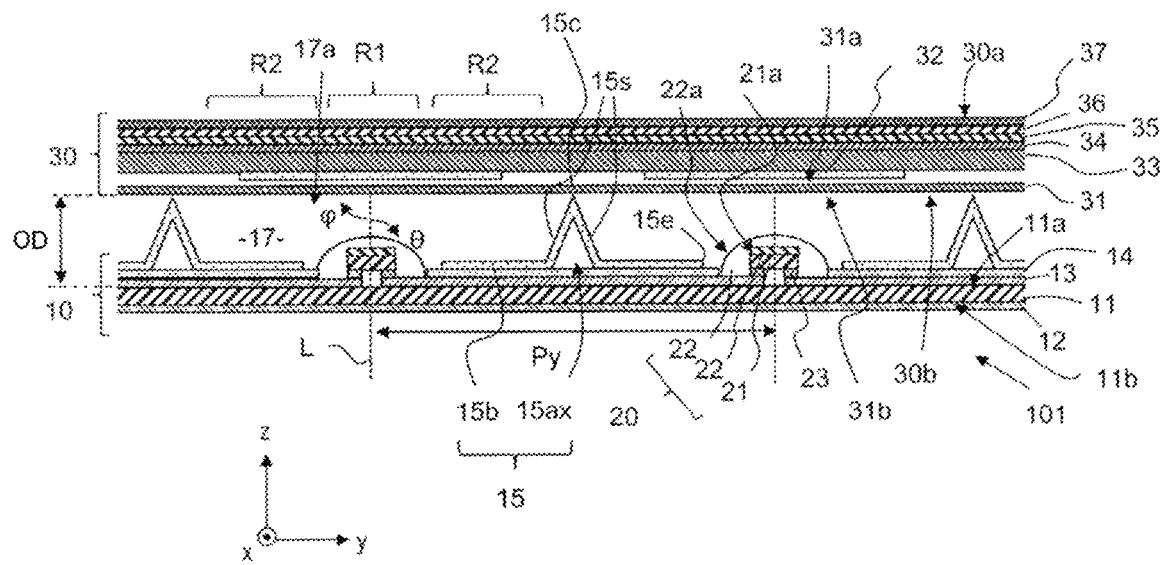
FIG. 1 is a cross-sectional view of an example of the light emitting device according to an embodiment of the present disclosure.

According to studies conducted by the present inventors, the reflectance of the half mirrors used in the light emitting devices disclosed in Japanese Unexamined Patent Application Publication Nos. 2012-174371 and 2012-212509 needs to be controlled at different locations depending on the display panel size and specifications. For this reason, such a half mirror must be prepared as an exclusive-use specialty member. This makes the half mirror very expensive, in particular one used in the light emitting device for a large screen LCD TV.

In the light emitting device disclosed in Japanese Unexamined Patent Application Publication No. 2012-212509, the half mirror is constructed by using aluminum for the reflective material. Because aluminum absorbs part of visible light, the light emitted from the light sources can be absorbed by the half mirror while repeatedly being reflected between the half mirror and the reflective plate. This can reduce the light extraction efficiency of the light emitting device. Because the reflectance of the half mirror differs depending on the location, a non-uniform luminance can be occurred along the boundaries of areas in which reflectances are different. In view of these problems, the present inventors arrived at the light emitting device having a novel structure.

Certain embodiments of the present disclosure will be explained in detail below with reference to the accompanying drawings. The embodiments described below are illustrations of the present disclosure, and the light emitting device according to the present disclosure is not limited to the embodiments discussed below. In the explanations below, terms indicating certain directions and positions will be used as needed (for example, "upper," "lower," "right," "left," and other terms including these). These terms are merely used for the sake of clarity of the relative directions and positions of the components in the drawings being referred to. As long as the relative directions and positions are the same as those indicated by the terms such as "upper" and "lower" in the referenced drawings, the components shown in the drawings other than the present disclosure or actual products do not need to have the same layouts as those shown in the drawings. The sizes of the constituent elements and their positional relationships shown in the drawings might be exaggerated for the sake of clarity, and might not reflect the sizes, or the magnitude relationship among the constituent elements in an actual surface emitting device. The terms "parallel" and "perpendicular"/"orthogonal" herein includes cases where the angle formed by two lines, sides, planes, or the like, respectively within the ranges of 0°±5° and 90°±5°, approximately.

Structure of Light Emitting Device 101

FIG. 1 is a cross-sectional view of the light emitting device 101 according to an embodiment. The light emitting device 101 is provided with a light source unit 10, which includes a mounting board 11 and a plurality of light sources 20 disposed on the mounting board 11, and a light transmissive multilayer stack 30, which includes a half mirror 31, a light diffusion plate 33, and diffuse reflectors 32. The light transmissive multilayer transmits the light from the light sources 20 of the light source unit 10. Each constituent element will be explained in detail below.

Mounting Board 11

The mounting board 11 includes an upper face 11a and a lower face 11b, and a plurality of light sources 20 are disposed on and supported by the upper face 11a. On the upper face 11a and the lower face 11b of the mounting board 11, the conductor wiring layer 13 and the metal layer 12 described in detail below are disposed. On the upper face 11a, moreover, dividing members 15 are disposed, each surrounding individual light sources 20.

For the material for the mounting board 11, a ceramic or resin can be used, for example. A resin may be selected as the material for the mounting board 11 from the perspective of low cost and ease of molding. Examples of resins include phenol resins, epoxy resins, polyimide resins, BT resins, polyphthalamide (PPA), and polyethylene terephthalate (PET). The thickness of the mounting board can be suitably selected, and the mounting board 11 may be either a flexible mounting board, which can be manufactured by roll-to-roll processing, or a rigid mounting board. The rigid mounting board may be of a thin type which is bendable.

A ceramic may be selected as the material for the mounting board 11 from the perspective of good resistance to heat and light. Examples of ceramics include alumina, mullite, forsterite, glass-ceramics, nitrides (e.g., AlN), carbides (e.g., SiC), and LTCCs.

The mounting board 11 may alternatively be formed with a composite material. Specifically, inorganic fillers, such as glass fibers, $SiO_2$, $TiO_2$, $Al_2O_3$, or the like can be mixed into the resins described above. Examples include glass fiber reinforced resins (e.g., glass epoxy resin). This can increase the mechanical strength, reduce the thermal expansion coefficient, and increase the reflectance of the mounting board 11.

It is sufficient to provide electrical insulation at least on the upper face 11a of the mounting board 11. The mounting board 11 may have a stack structure. For example, a metal plate with an insulating layer disposed on the surface thereof may be used as the mounting board 11.

Conductor Wiring Layer 13

The conductor wiring layer 13 is disposed on the upper face 11a of the mounting board 11. The conductor wiring layer 13 includes a wiring pattern for supplying power to the plurality of light sources 20 from the outside. The material for the conductor wiring layer 13 can be suitably selected in accordance with the material used for the mounting board 11, the manufacturing method, and the like. For example, if a ceramic is used for the mounting board 11, the conductor wiring layer 13 is formed with, for example, a high melting point metal that can be sintered simultaneously with the ceramic. The conductor wiring layer 13 is formed with a high melting point metal, for example, tungsten, molybdenum, or the like. The conductor wiring layer 13 may have a multilayer structure. For example, the conductor wiring layer 13 may be equipped with a high melting point metal pattern formed by the method described above, and a metal layer which contains another metal such as nickel, gold, or silver, and is disposed on the pattern by plating, sputtering, or vapor deposition.

If a glass epoxy resin is used as the mounting board 11, it is preferable to use a material for the conductor wiring layer 13 that can be readily processed. For example, a metal layer containing copper, nickel, or the like, formed by plating, sputtering, vapor deposition, or pressing can be used. The metal layer can be processed into a predetermined wiring pattern by printing or photolithography through masking and etching.

Metal Layer 12

The light source unit 10 may further include a metal layer 12 on the lower face 11b of the mounting board 11. The metal layer 12 may be disposed across the entire lower face 11b for heat dissipation. The lower face of 11b of the mounting board 11 may alternatively have a wiring pattern. For example, the metal layer 12 may have a drive circuit pattern for driving the light sources 20. The metal layer 12 may further include drive circuit components on the circuit pattern.

Light Source 20

Figure 2:
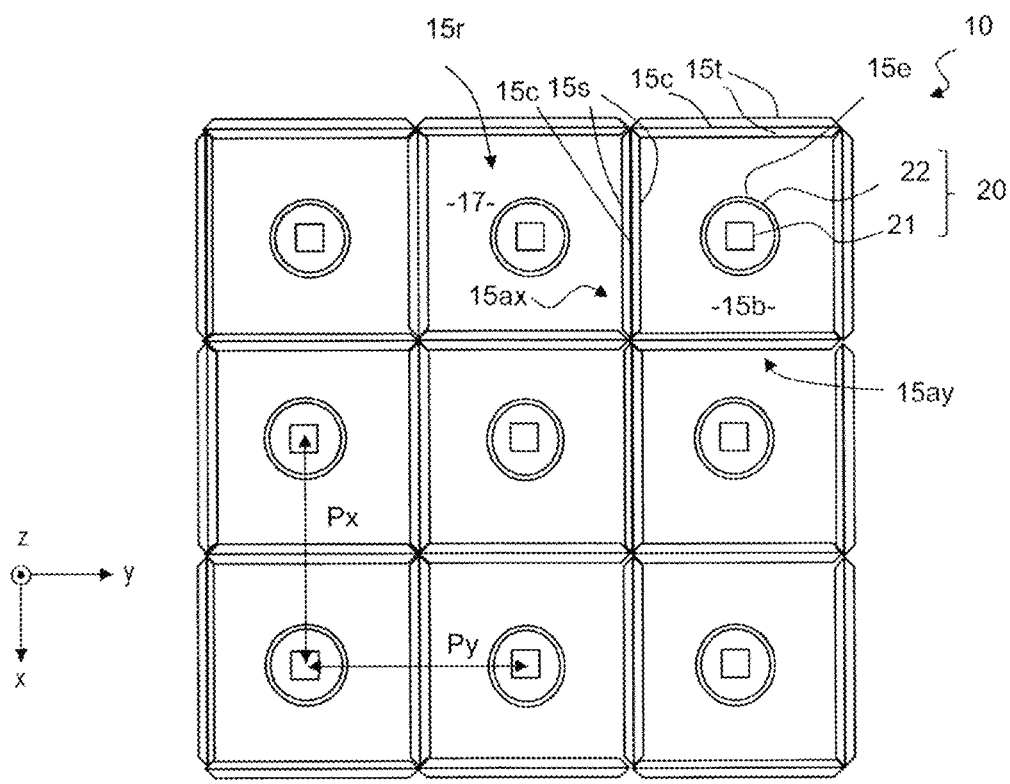
FIG. 2 is a top view of a light source unit.

The plurality of light sources 20 are arranged on the upper face 11a of the mounting board 11. FIG. 2 is a top view of the light source unit 10. The plurality of light sources 20 are arranged one-dimensionally or two-dimensionally on the upper face 11a of the mounting board 11. In the present embodiment, the plurality of light sources 20 are two-dimensionally arranged along two orthogonal directions, in other words, the x direction and the y direction where the pitch Px in the x direction and the pitch Py in the y direction, are the same. The arrangement directions, however, are not limited to these. The pitches in the x and y directions may be different, and the directions of arrangement do not have to be orthogonal to one another. The pitch is not limited to that of equal intervals, and may be of irregular intervals. For example, the light sources 20 may be arranged such that the intervals increase from the center to its periphery of the mounting board 11.

Each light source 20 includes at least a light emitting element 21 including an emission face 21a. The light source 20 may include a cover member 22 that covers the emission face 21a. If the light source 20 includes a cover member 22, the surface 22a of the cover member 22 is the emission face of the light source 20. If the light source has no cover member 22, the emission face 21a of the light emitting element 21 also serves as the emission face of the light source 20. Each light source 20 may include one or one type of light emitting element 21. In this case, it may be adapted to have the light emitting element 21 emitting white light, or have the light source 20 emitting white light as a whole by allowing the light emitted from the light emitting element 21 to transmit through the cover member 22. The light source 20, for example, may be a light emitting element which includes three light emitting components that individually emit red, blue, and green light, or may include three light emitting elements that individually emit red, blue, and green light, to emit white light as a result of having the red, blue, and green light be mixed. Alternatively, the light source 20 may include a light emitting element that emits white light and a light emitting element that emits another color to enhance the color rendering properties of the light emitted from the light source 20.

The light emitting element 21 is a semiconductor light emitting element, and a known light emitting element such as a semiconductor laser, light emitting diode, or the like can be utilized. In the present embodiment, a light emitting diode is used for each light emitting element 21 by way of example. For the light emitting element 21, one that emits light of any given wavelength can be selected. For example, for a blue or green light emitting element, one that employs ZnSe, nitride based semiconductor ($In_xAl_yGa_{1-x-y}N$, $0 \leq X$, $0 \leq Y$, $X+Y \leq 1$)), or GaP can be used. For a red light emitting element, one that employs GaAlAs, AlInGaP, or the like can be used. Moreover, a semiconductor light emitting element composed of other materials than the above can alternatively be used. The compositions, emission colors, sizes, and the number of the light emitting elements used can be suitably selected in accordance with the purpose. In the case where the cover member 22 is provided with a wavelength conversion member, it is preferable for the light emitting element 21 to include a nitride based semiconductor ($In_xAl_yGa_{1-x-y}N$, $0 \leq X$, $0 \leq Y$, $X+Y \leq 1$) capable of emitting light having a short wavelength to efficiently excite the wavelength conversion member.

Various emission wavelengths can be selected by adjusting the materials or mixed crystal compositions employed for the semiconductor layers. The light emitting element may have both positive and negative electrodes on the same face, or have one electrode on one face and the other electrode on the other face.

The light emitting element 21, for example, has a light transitive mounting board, and a semiconductor stack structure formed on the mounting board. The semiconductor stack structure includes an n-side semiconductor layer and a p-side semiconductor layer which interpose an active layer, and an n-side electrode and a p-side electrode are respectively electrically connected to the n-side semiconductor layer and the p-side semiconductor layer. In the present embodiment, the n-side electrode and the p-side electrode are both located on the face opposite the emission face.

The n-side electrode and the p-side electrode of a light emitting element 21 are electrically connected and secured to the conductor wiring layer 13 disposed on the upper face 11a of the mounting board 11 using the bonding members 23 described later. In other words, the light emitting elements 21 are mounted on the mounting board 11 by flip chip bonding.

Each light emitting element 21 may be a bare chip, or equipped with a package which includes a reflector on the lateral face side. It may further include a lens or the like to broaden the emission angle of the light emitted from the emission face 21a.

The cover member 22 covers at least the emission face 21a of the light emitting element 21, and is supported by the upper face 11a of the mounting board 11. The cover member 22 reduces the instances of the emission surface 21a being exposed and damaged by external factors. For the cover member 22, a light transmissive material such as an epoxy resin, silicone resin, a mixture of these, or glass, can be used. For the light resistance and the ease of molding of the cover member 22, selecting a silicone resin for the cover member 22 is preferred.

The cover member 22 may contain a diffuser, wavelength conversion material, coloring agent, or the like. For example, a light source 20 may include a light emitting element 21 which emits blue light and a wavelength conversion material that converts blue light into yellow light, in such a manner as to emit white light by way of combining blue light and yellow light. Alternatively, the light source 20 can include a light emitting element 21 which emits blue light, a wavelength conversion material which converts blue light into green light, and a wavelength conversion material which converts blue light into red light, in such a manner as to emit white light by way of combining blue light, green light, and red light. Examples of wavelength conversion materials which convert blue light into green light include β-SiAlON phosphors, and those converting blue light into red light include fluoride-based phosphors, such as KSF-based phosphors. Containing a β-SiAlON phosphor and a fluoride-based phosphor such as KSF phosphor as wavelength conversion materials can increase color reproduction range of the light emitting device. Alternatively, a light source including a semiconductor light emitting element which emits blue light, a semiconductor light emitting element which emits green light, and a wavelength conversion material which converts blue or green light into red light may be used.

The cover member 22 can be formed by compression molding or injection molding in such a manner as to cover the emission face 21a of each light emitting element 21. The cover member 22 can alternatively be formed by appropriately adjusting the viscosity of the material which is then dripped or drawn on the light emitting element 21 to allow the surface tension of the material itself to control its shape. In the case of employing the latter method, the cover member can be formed in a more simplified manner without requiring dies. The viscosity of the material for the cover member 22 can be adjusted by utilizing the aforementioned diffuser, wavelength conversion material, or coloring agent, besides appropriately adjusting the viscosity of the material itself.

Figure 3:
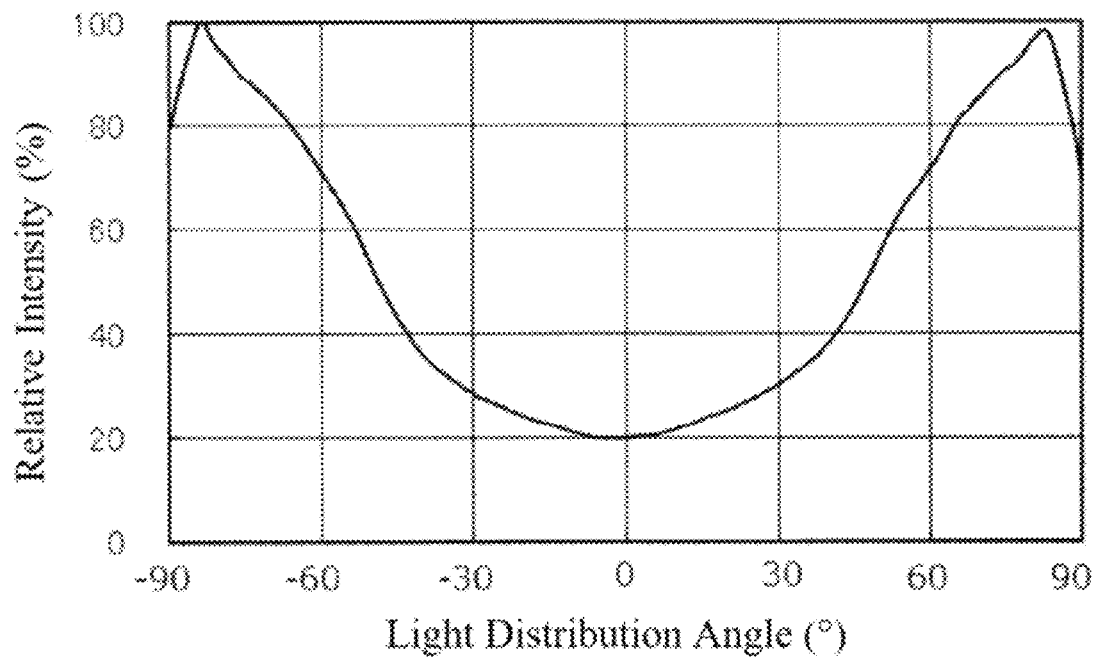
FIG. 3 is a chart showing an example of the luminous intensity distribution characteristics of the light emitted from the light source.

FIG. 3 is a chart showing an example of the luminous intensity distribution characteristics of the light emitted from a light source 20. It is preferable for a light source 20 to have batwing type luminous intensity distribution characteristics. This can control the amount of light emitted from the light sources 20 in the direction directly above them, and broaden the light distribution of individual light sources 20, thereby improving on the non-uniform luminance. Broadly defined, a batwing type luminous intensity distribution characteristic means a luminous intensity distribution in which the emission intensity increases as the absolute values of distribution angles become greater than 0° when assuming the optical axis L of a light source 20 is 0°. Narrowly defined, a batwing type luminous intensity distribution characteristic means a luminous intensity distribution in which the emission intensity is highest near absolute values of distribution angles of from 45° to 90°. In other words, in the case of batwing type luminous intensity distribution characteristics, the central portion is less bright than the peripheral portion.

In order to achieve batwing type luminous intensity distribution characteristics, the light source 20 may include a reflective layer 24 disposed on the emission face 21a of the light emitting element 21. The reflective layer 24 may be a metal film or a dielectric multilayer film. This allows the light emitted upward from the light emitting element 21 to be reflected by the light reflective layer, which reduces the quantity of light directly above the light emitting element 21, thereby achieving batwing type luminous intensity distribution characteristics. Alternatively, the light source having batwing type luminous intensity distribution characteristics can be achieved by adjusting the outer shape of the cover member 22.

Bonding Member 23

Bonding members 23 electrically connect and secure the light emitting elements 21 to the conductor wiring layer 13. Examples of the bonding members 23 include an Au-containing alloy, Ag-containing alloy, Pd-containing alloy, In-containing alloy, Pb—Pd-containing alloy, Au—Ga-containing alloy, Au—Sn-containing alloy, Sn-containing alloy, Sn—Cu-containing alloy, Sn—Cu—Ag-containing alloy, Au—Ge-containing alloy, Au—Si-containing alloy, Al-containing alloy, Cu—In-containing alloy, a metal and flux mixture, and the like.

The bonding members 23 may be in a liquid form, paste form, or solid form (sheet, block, powder, or wire), which can be suitably selected depending on the composition, mounting board shape, or the like. These bonding members 23 may be formed using a single material, or a combination of several types.

The bonding members 23 do not have to electrically connect the light emitting elements 21 and the conductor wiring layer 13. In this case, the bonding members 23 connect the areas of the light emitting element 21 other than the p-side electrode and n-side electrode to the upper face 11a of the mounting board 11, while the p-side electrode and the n-side electrode are electrically connected to the conductor wiring layer 13 using wires.

Insulating Member 14

The light source unit 10 may further include an insulating member 14 that covers the areas of the conductor wiring layer 13 other than those that are electrically connected to the light emitting elements 21 and other elements. As shown in FIG. 1, the insulating member 14 is disposed on parts of the conductor wiring layer 13 on the upper face 11a side of the mounting board 11. The insulating member 14 functions as a resist that provides insulation to the areas of the conductor wiring layer 13 other than those areas electrically connected to the light emitting elements 21 and other elements. Examples of the insulating member 14 can be a resin or resin containing a reflecting substance composed of oxide particles such as titanium oxide, aluminum oxide, silicon oxide, or the like, dispersed in the resin to reflect the light from the light emitting elements 21. A reflective insulating member 14 reflects the light emitted from the light emitting elements 21 on the upper face 11a side of the mounting board 11, and prevents or discourages the light from leaking through or being absorbed at the mounting board 11 side, thereby improving the light extraction efficiency of the light emitting device.

Dividing Member 15

The dividing members 15 include wall portions 15ax and 15ay, and bottom portions 15b. As shown in FIG. 2, the wall portions 15ay are disposed to extend in the y direction between two light sources 20 that are adjacent in the x direction, and the wall portions 15ax are disposed to extend in the x direction between two light sources 20 that are adjacent in the y direction. Thus, each light source 20 is surrounded by two wall portions 15ax extending in the x direction and two wall portions extending in the y direction. A bottom portion 15b is located in the region 15r which is surrounded by two wall portions 15ax and two wall portions 15ay. In the present embodiment, the outer shape of the bottom portion 15b is a square because the light sources 20 are arranged at the same pitch in x and y directions.

A through hole 15e is provided in the center of each bottom portion 15b, and the bottom portions 15b are disposed on the insulating member 14 so that the light sources 20 are positioned in the through holes 15e. There are no restrictions for the shape and size of the through holes 15e so long as they are shaped and sized to position the light sources 20 therein. It is preferable for the outer perimeter of each through hole 15e to be positioned in the vicinity of a light source 20, i.e., the gap between a through hole 15e and a light source 20 in a top view is small, such that the light from the light source 20 can also be reflected by the bottom portion 15b.

As shown in FIG. 1, in a y-z cross section, each wall portion 15ax includes a pair of oblique faces 15s extending in the x direction. The pair of oblique faces 15s are in contact with one another at one of the two sides that extend in the x direction to form a ridge 15c. The other side of each oblique face is respectively connected to the bottom portions 15b located in two adjacent regions 15r. Likewise, each wall portion 15ay includes a pair of oblique faces 15t extending in the y direction. The pair of oblique faces 15t are contacting one another at one of the two sides that extend in the y direction to form a ridge 15c. The other side of each oblique face is respectively connected to the bottom portions 15b located in two adjacent regions 15r.

An emission space 17 include an opening 17a is formed by a bottom portion 15b, two wall portions 15ax, and two wall portions 15ay. FIG. 2 shows emission spaces 17 arranged in three rows and three columns. A pair of oblique faces 15s and a pairs of oblique faces 15t face the opening 17a of an emission space 17.

The dividing members 15 have reflectivity, and the light emitted from the light sources 20 is reflected by the oblique faces 15s and 15t of the wall portions 15ax and 15ay towards the openings 17a of the emission spaces 17. Furthermore, the light incident on the bottoms 15b is also reflected towards the openings 17a of the emission spaces 17. This allows the light emitted from the light sources 20 to be efficiently incident on the light transmissive multilayer stack 30.

An emission space 17 defined by the dividing member 15 represents the minimum unit of the emission space when the plurality of light sources 20 are independently driven. This also represents the minimum unit area of local dimming when viewing the light emitting device 101 from the upper face 30a of the light transmissive multilayer stack 30 as a surface emission source. In the case of independently driving the light sources 20, it can be realized that a light emitting device can be driven by local dimming in the smallest emission space units. By simultaneously driving a plurality of adjacent light sources 20 while synchronizing the ON/OFF timing, it can be possible to drive the light emitting device by way of local dimming in larger units.

The dividing members 15 can be formed by using, for example, a resin containing a reflecting substance composed of particles of a metal oxide, such as titanium oxide, aluminum oxide, silicon oxide, or the like. If formed with a resin containing no reflecting substances, a reflector may be disposed on the surfaces thereof. The reflectance of the dividing members 15 for the light emitted from the light sources 20 is preferably, for example, at least 70%.

The dividing members 15 can be formed by molding using dies, or optical shaping. Examples of molding methods using dies include injection molding, extrusion molding, compression molding, vacuum forming, and pressure forming. For example, vacuum forming the dividing members using a reflective sheet made of PET or the like can form the dividing members 15 where the bottom potion 15b, wall portions 15ax, and 15ay are integrally formed. The thickness of the reflecting sheet can be, for example, 100 µm to 500 µm.

The lower faces of the bottoms 15b of the dividing members 15 and the upper face of the insulating member 14 are secured by an adhesive or the like. The insulating member 14 exposed at the through holes 15e preferably has reflectivity. It is preferable to dispose a bonding material to surround the through holes 15e such that the light emitted from the light sources 20 does not penetrate between the insulating member 14 and the dividing members 15. For example, a bonding material is preferably disposed in a ring shape along the circumference of a through hole 15e. The adhesive member may be a double-sided tape, hot melt adhesive sheet, or adhesive liquid of a thermosetting resin or thermoplastic resin. These bonding materials are preferably highly flame retardant. Alternatively, they may be secured by using screws, pins, or the like.

Half Mirror 31

The half mirror 31 of the light transmissive multilayer stack 30 is disposed above the light sources 20 in such a manner as to cover the emission spaces 17 of the light source unit 10.

The half mirror 31 has the reflection and transmission characteristics where it reflects some portion of the incident light while transmitting the remaining portion of the light. The half mirror 31 has a reflectance of in a range of about 30% to about 75% for the emission spectrum of the light source. The reflectance of the half mirror 31 is substantially equal across the entire area of the half mirror 31. Here, "substantially equal" refers to, for example, that the reflectance of light perpendicularly incident measured at any given location of the principal plane (i.e., upper face 31a or lower face 31b) is within ±5% of the average value.

The half mirror 31 preferably has a dielectric multilayer structure where two or more dielectric films of varying refractive indices are stacked on a light transmissive base. Specific examples of the materials for the dielectric films include metal oxide film, metal nitride film, metal fluoride film, and resins such as polyethylene terephthalate (PET). It is preferable to employ a material that does not readily absorb the light from the light sources 20 or the later described wavelength conversion layer 34. The dielectric multilayer film reflects portion of the incident light at the boundaries of the stacked dielectric films due to a refractive index difference. The reflectance can be adjusted by the thickness of a dielectric film which changes the phase shift between the incident light and the reflected light to adjust the interference between the two. Phase adjustments based on the thickness of a dielectric film depends on the wavelength of the light passing therethrough. By stacking multiple layers of dielectric films such that each dielectric film reflects light of a different wavelength, the wavelength dependency of the reflectance can also be adjusted. Accordingly, a dielectric multilayer film can produce a half mirror 31 that does not readily absorb light while being capable of suitably adjusting reflectance characteristics.

When using a dielectric multilayer structure, even if a dielectric film has a uniform thickness, the optical path length differs between perpendicularly-incident light and obliquely-incident light. For this reason, it is also possible to control the reflectance of the half mirror 31 based on the angle of incidence of the incident light. By setting the reflectance to be lower for obliquely incident light than perpendicularly-incident light, the reflectance in the direction of the optical axis L of a light source 20, i.e., in the direction perpendicular to the principal plane of the half mirror 31, can be increased while reducing the reflectance for the light being incident at a large angle φ relative to the optical axis L. In other words, increasing the transmittance at larger angles of incidence can further reduce the non-uniform luminance across the surface of the light emitting device when observed from the outside.

Figure 4:
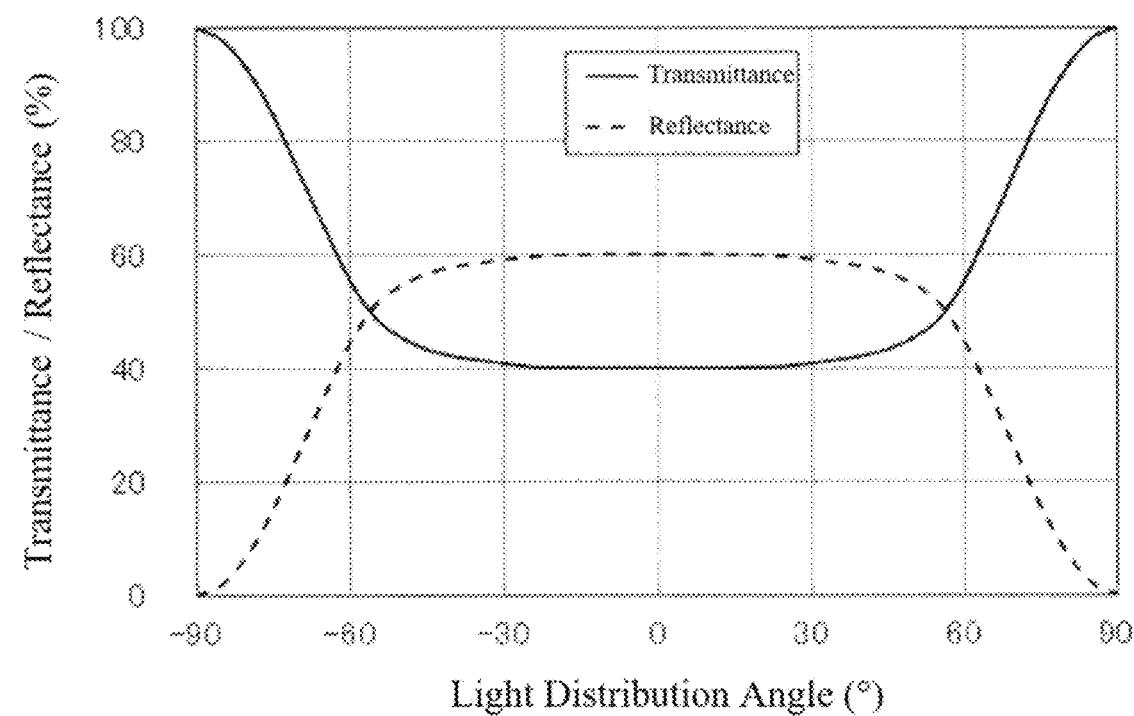
FIG. 4 is a chart showing the dependency of the reflectance and transmittance of the half mirror in the embodiment on the light distribution angle by way of example.

FIG. 4 shows the dependency of the reflectance and transmittance of the half mirror 31 on the light distribution angle by way of example. Assuming that the optical axis L is 0°, where the absolute value of the light distribution angle φ in FIG. 1) is in the range of up to about 40°, the reflectance is 60%. The reflectance declines while the transmittance increases in the range where the absolute value is over 40°. Providing the half mirror with such reflectance characteristics can more effectively reduce the non-uniform luminance discussed earlier.

Figure 5:
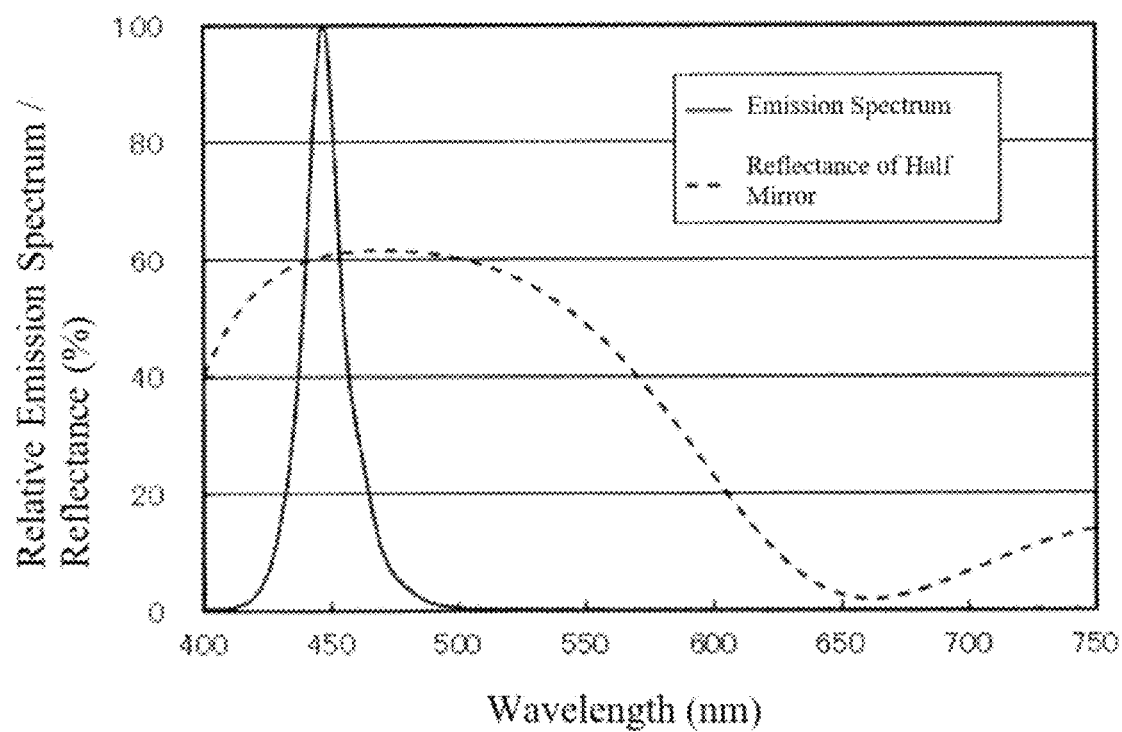
FIG. 5 is a chart showing the relationship between the reflectance spectrum of the half mirror and the emission wavelengths of the light emitting elements in the embodiment.

FIG. 5 is a chart showing the emission spectrum of the light emitted from the light source 20 and the reflectance characteristics of the half mirror 31 by way of example. The horizontal axis represents wavelengths, and the vertical axis represents reflectance or relative emission intensity. The reflectance values are those measured in the direction perpendicular to the principal plane of the half mirror 31. With respect to the reflectance characteristics of the half mirror 31 in the perpendicular direction, it is preferable for the reflectance spectrum on the longer side of the peak emission wavelength of the light source 20 to be broader than that on the shorter side. In the example shown in FIG. 5, the peak emission wavelength of the light source 20 is about 450 nm. The reflectance bandwidth where the half mirror 31 has a reflectance of at least 40%, for example, is 50 nm (i.e., 400 nm to 450 nm) on the shorter wavelength side from 450 nm, whereas is 120 nm (i.e., 450 nm to 570 nm) on the longer wavelength side from 450 nm the bandwidth.

In general, the reflectance spectrum of a half mirror shifts to the shorter wavelength side because the optical path length increases when light is obliquely incident as compared to perpendicularly incident. For example, even if a half mirror has a certain reflectance for light having a wavelength λ when the light is perpendicularly incident on the half mirror, the reflectance spectrum shifts to the shorter wavelength side by δ when the light is obliquely incident on the half mirror. For this reason, even though the half mirror has the same reflectance for light having wavelengths shorter than λ by the amount corresponding to the reflectance spectrum shift δ, its reflectance declines for the light having wavelength λ.

By designing the reflectance characteristics of the half mirror 31 in the perpendicular direction such that the reflectance bandwidth on the longer wavelength side of the peak emission wavelength of a light source 20 is broader than that on the shorter wavelength side as described above, the half mirror provided with a broad reflectance bandwidth on the longer wavelength side can maintain the same reflectance even if obliquely incident light shifts the reflectance spectrum to the shorter wavelength side by δ. Even if light obliquely enters the half mirror 31 in the aforementioned range of absolute values of light distribution angles of up to about 40°, this can more effectively prevent or discourage a decline of the reflectance and an increase of the transmittance of the light entering slightly obliquely relative to the optical axis L of the light source 20 which could otherwise emphasize the non-uniform luminance.

Light Diffusion Plate 33

The light diffusion plate 33 is positioned on the upper face 31a side of the half mirror 31. The light diffusion plate 33 diffuses and transmits incident light. A material of the light diffusion plate 33 can include that does not readily absorb visible light, such as a polycarbonate resin, polystyrene resin, acrylic resin, polyethylene resin, or the like. The light diffusion plate 33 is provided with a light diffusing structure by way of projections and depressions provided on the surface, or a material having a different refractive index dispersed in the light diffusion plate 33. For the light diffusion sheet, those commercially available generally known as a diffusion sheet, diffuser film, or the like may be used.

Diffuse Reflector 32

The diffuse reflectors 32 are positioned between the half mirror 31 and the light diffusion plate 33, or on the lower face 31b of the half mirror 31. In the present embodiment, the diffuse reflectors 32 are provided on the lower face 33b of the light diffusion plate 33. If the light diffusion plate 33 is constructed with a polystyrene resin, the diffuse reflectors 32 are preferably disposed on the half mirror 31. This can prevent or discourage misalignment between the light sources 20 and the diffuse reflectors 32 attributable to thermal expansion because the material used for constructing the half mirror 31 has a smaller linear expansion coefficient than that of polystyrene resin.

Figure 6:
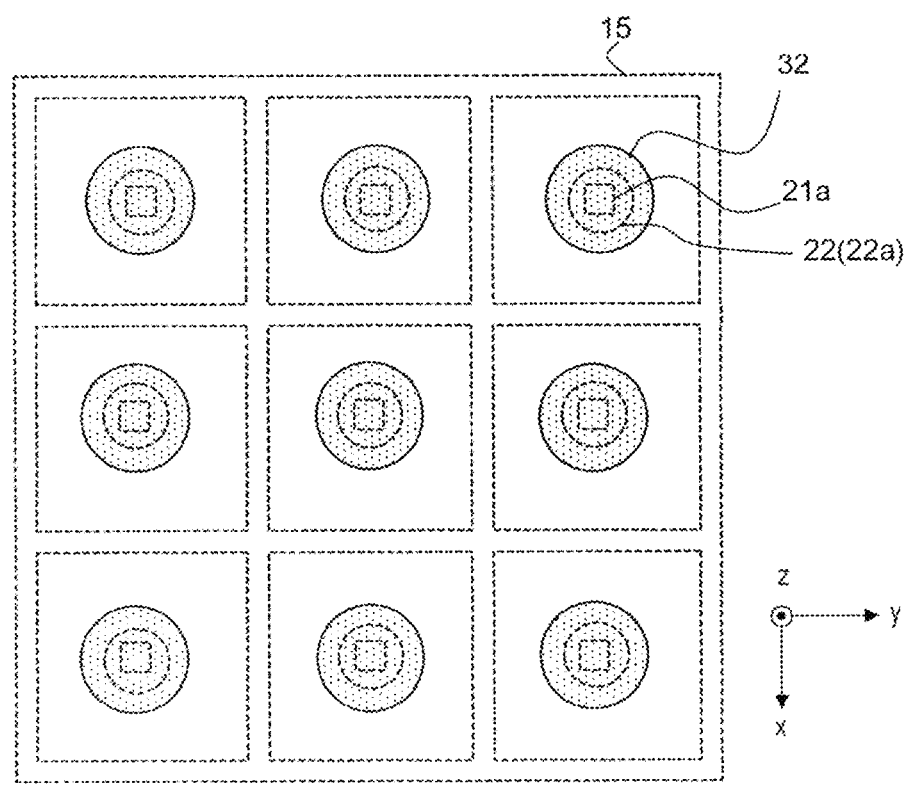
FIG. 6 is a top view showing the layout of the diffuse reflectors in the embodiment.

FIG. 6 shows the positional relationship between the diffuse reflectors 32 and the emission faces (the surfaces 22a of the cover members 22 or the emission faces 21a) of the light sources 20 when viewing the light emitting device 101 from the top. As shown in FIG. 1 and FIG. 6, the diffuse reflectors 32 are positioned at least above the emission face of each light source 20, i.e., above the optical axis of each light source 20. The diffuse reflectors 32 scatter and reflect incident light. Since the light emitted from the light sources 20 is intense above the optical axis L, providing the diffuse reflectors 32 can attenuate the non-uniform luminance in the light emitted from the light sources 20. Assuming that the optical axis of a light source 20 is 0°, the emission intensity is relatively lower at an absolute value of light distribution angle larger than 0°. Since there is no need to scatter light at an area above the ridges 15c of the dividing members 15 which are the boundaries of the emission spaces 17, diffuse reflectors 32 may not be provided above the ridges.

In FIG. 6, the diffuse reflectors 32 are circular in shape centering around the optical axis of each light source 20, but the shape of the diffuse reflectors is not required to a circle. The shape of the diffuse reflectors 32 can be determined in accordance with the light distribution characteristics of the light sources 20 such that light can be uniformly scattered, such as an ellipse, quadrangle, or the like. In the case where the emission intensity of a light source 20 is lower above the optical axis than the periphery of the optical axis because the light source 20 has batwing type luminous intensity distribution characteristics, or such other reasons, the diffuse reflectors 32 may have, for example, a ring shape in a top view. In other words, the diffuse reflector 32 only need to be positioned above part of the emission face of each light emitting source 20.

In the case where the ridges 15c are in contact with the light diffusion plate 33 or the half mirror 31, the light reflected by the light diffusion plate 33 or the half mirror 31 increases the amount of light that irradiates wall portions 15ax and 15ay, thereby making the areas near the ridges 15c brighter. It is thus preferable to dispose the diffuse reflectors 32 directly above the wall portions 15ax and 15ay. This can attenuate the non-uniform luminance that would otherwise result from the areas near the ridges 15c becoming brighter.

The diffuse reflectors 32 include a resin, and reflecting oxide substance particles, such as titanium oxide, aluminum oxide, silicon oxide, or the like dispersed in the resin. The average particle size of the oxide particles, for example, is about 0.05 μm to about 30 μm. The diffuse reflectors 32 may further contain a pigment, light absorbing material, phosphor, or the like. In the case of the resin employs a light curable material that contains acrylate, epoxy, or the like as a major component, the diffuse reflectors 32 can be formed by irradiating, for example, with UV rays after applying a curable resin containing the reflecting substance on the lower face 33b of the light diffusion plate 33. The curable resin may alternatively be cured by the light emitted from the light sources 20. The uncured resin with a reflecting substance dispersed therein can be applied, for example, by a printing technique using a printing plate or an inkjet technique.

Figure 7A:
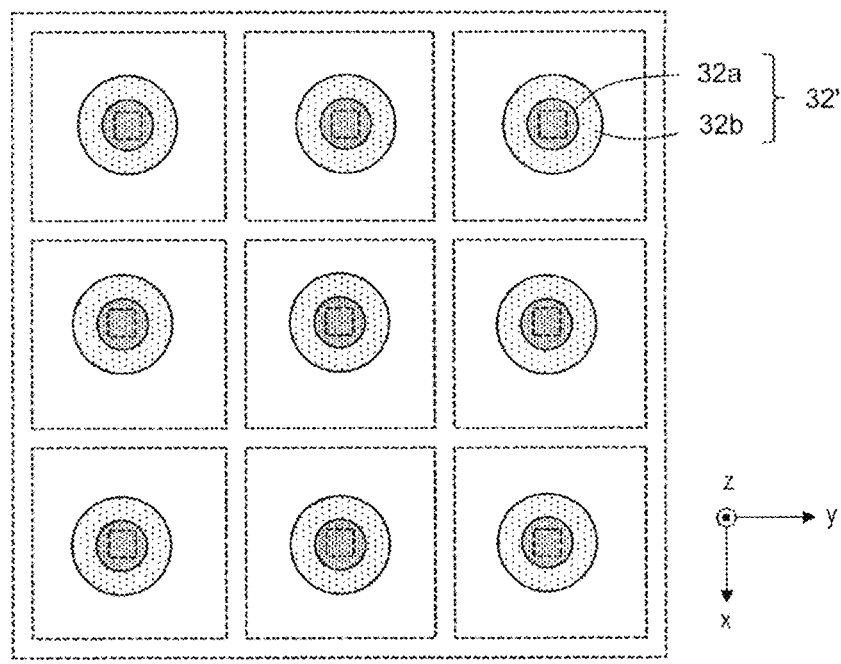
FIG. 7A is a top view showing another layout of the diffuse reflectors in the embodiment.

The reflecting particles for scattering light can be uniformly distributed in the diffuse reflectors 32, or arranged in higher density in the areas of smaller absolute values of light distribution angles of the light sources 20 than the areas of larger absolute values of light distribution angles. Each diffuse reflector 32' shown in FIG. 7A includes a first portion 32a and a second portion 32b. The first portion 32a is positioned directly above an emission face 21a, and the second portion 32b is positioned in the periphery of the first portion 32a.

The reflecting particle density in the second portion 32b is lower than the reflecting particle density in the first portion 32a. Particle density here, for example, can be a number density expressed by the number of particles per unit area of a plane viewed from the top view, i.e., an x-y plane.

Figure 7B:
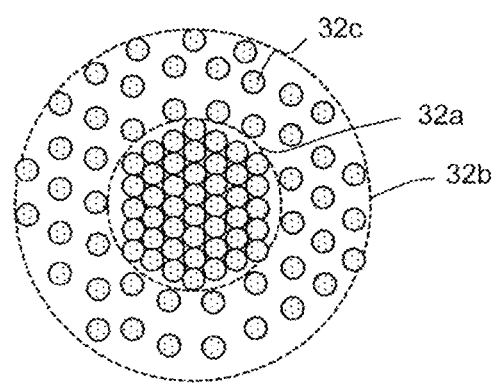
FIG. 7B is a top view showing a structure of the diffuse reflectors in the embodiment.
Figure 7C:
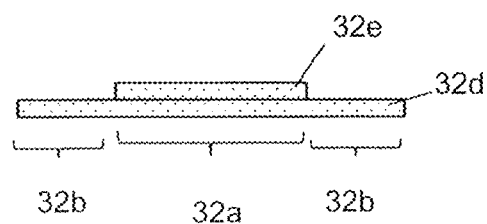
FIG. 7C is a cross-sectional view showing another structure of the diffuse reflectors in the embodiment.

For example, the diffuse reflectors 32' can be formed by arranging micro areas 32c composed of an uncured resin in which reflecting particles are dispersed more densely in the first portion 32a and less densely in the second portion 32b by printing or inkjet as shown, in FIG. 7B. As shown in FIG. 7C, a first layer 32d of an uncured resin in which reflecting particles are dispersed may be formed on both the first portion 32a and the second portion 32b, followed by forming a second layer 32e only on the second portion 32b. The diffuse reflectors 32' shown in FIGS. 7B and 7C both satisfy the relationship of the reflecting particle density in the diffuse reflectors 32' in an x-y plane described above.

Figure 8:
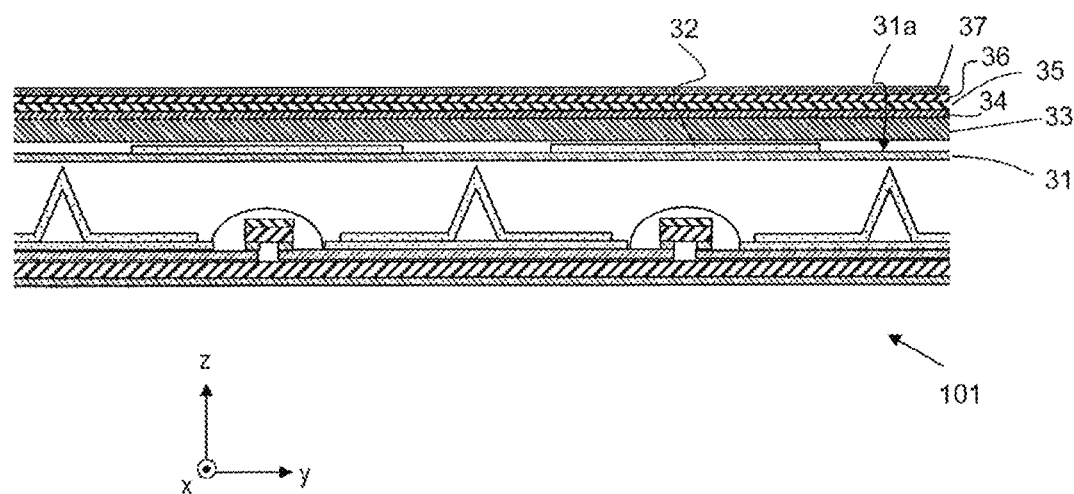
FIG. 8 is a cross-sectional view of another example of the light emitting device according to an embodiment.
Figure 9:
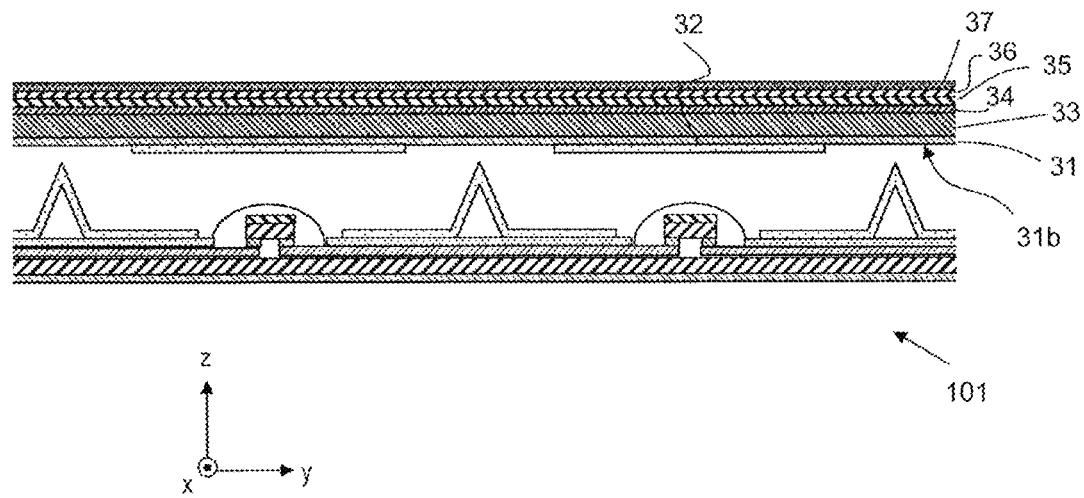
FIG. 9 is a cross-sectional view of another example of the light emitting device according to an embodiment.
Figure 10:
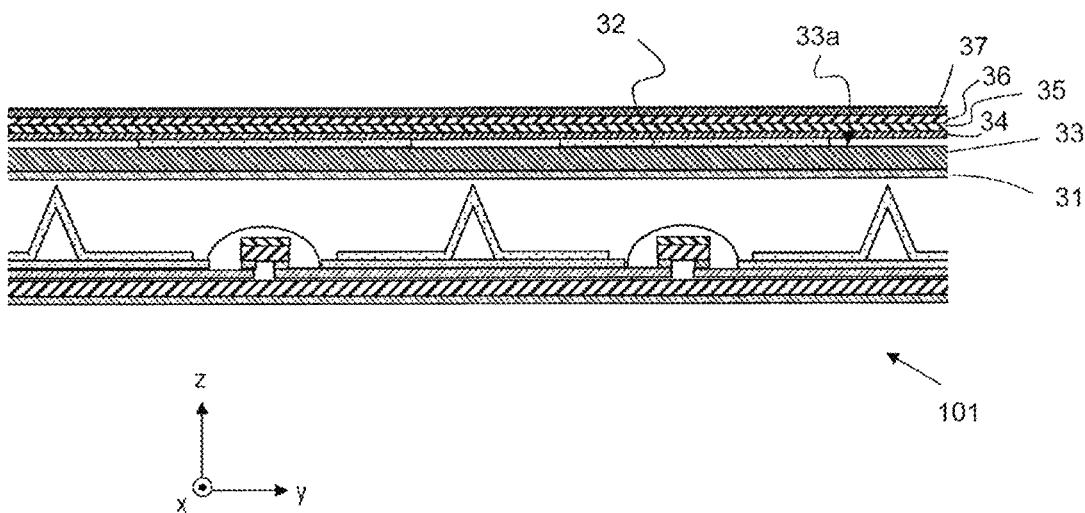
FIG. 10 is a cross-sectional view of another example of the light emitting device according to an embodiment.

The diffuse reflectors 32 may be disposed on the upper face 31a of the half mirror 31 as shown in FIG. 8 or on the lower face 31b of the half mirror 31 as shown in FIG. 9. Alternatively, the diffuse reflectors 32 may be disposed on the upper face 33a of the light diffusion plate 33 as shown in FIG. 10.

Wavelength Conversion Layer 34

The light emitting device 101 may further include a wavelength conversion layer 34 in the light transmissive multilayer stack 30. The wavelength conversion layer 34 is positioned on the light diffusion plate 33 side opposite the half mirror 31 side, i.e., on the upper face 33a. The wavelength conversion layer 34 absorbs portion of the light emitted from the light sources 20, and emits light having different wavelengths from those of the light emitted from the light sources 20.

Since the wavelength conversion layer 34 is distant from the light emitting elements 21 of the light sources 20, a wavelength conversion material that is less resistant to heat or light and not suitable for use near the light emitting elements 21 can also be used. This can improve the performance of the light emitting device 101 as a backlight. The wavelength conversion layer 34 is in a sheet or layer form, and contains the wavelength conversion substance described above.

Figure 11:
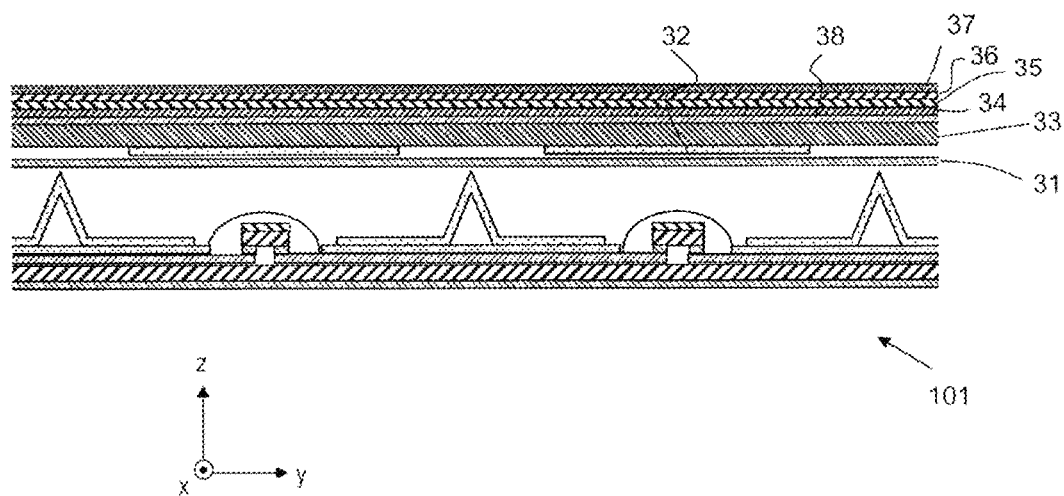
FIG. 11 is a cross-sectional view of another example of the light emitting device according to an embodiment.

In the case where a wavelength conversion layer 34 is employed, a dichroic layer 38 having a higher reflectance for the wavelengths of the light emitted from the wavelength conversion layer 34 than that for the emission wavelengths of the light sources 20 may be provided between the wavelength conversion layer 34 and the half mirror 31 as shown in FIG. 11.

Prism Array Layers 35 and 36, Reflective Polarizing Layer 37

The light emitting device 101 may further include prism array layers 35 and 36, and a reflective polarizing layer 37 in the light transmissive multilayer stack 30. The prism array layers 35 and 36 have the format of arranging a plurality of prisms in a predetermined direction. For example, the prism array layer 35, in FIG. 1, includes a plurality of prisms extending in the y direction and the prism array layer 36 includes a plurality of prisms extending in the x direction. The prism array layers 35 and 36 refract the light entering from various directions towards the display panel that opposes the light emitting device (i.e., the z direction). This can increase the component of the light output by the upper face 30a of the light transmissive multilayer stack 30 serving as the emission face of the light emitting device 101 in perpendicular direction to the upper face 30a (i.e., parallel to the z-axis), thereby increasing the luminance of the light emitting device 101 when viewed from the front (i.e., in the z-axis direction).

The reflective polarizing layer 37 selectively passes the light having the polarization direction consistent with the polarization direction of the polarizer disposed on the backlight side of a display panel, for example, an LCD panel, while reflecting the polarized light perpendicular to the polarization direction back to the prism array layers 35 and 36. Portion of the polarized light returning from the reflective polarizing layer 37 is converted into the polarized light having the polarization direction of the polarizer of the LCD panel as its polarization direction is changed when re-reflected by the prism array layers 35 and 36, the wavelength conversion layer 34, and the light diffusion plate 33, and is incident on the reflective polarizing layer 37 again to be released toward the display panel. This aligns the polarization directions of the light emitted from the light emitting device 101, and enables a highly efficient emission of the light having the polarization direction that effectively increase the luminance of the display panel.

For the prism array layers 35 and 36, and the reflective polarizing layer 37, those commercially available optical members for backlight applications can be employed.

Light Transmissive Multilayer Stack 30

The light transmissive multilayer stack 30 is structured by stacking the half mirror 31, the diffuse reflectors 32, the light diffusion plate 33, the wavelength conversion layer 34, the prism array layers 35 and 36, and the reflective polarizing layer 37 described above on top of one another. At least one interface of these layers may have a space where the layers are not in contact with one another. However, in order to minimize the thickness of the light emitting device 101, it is preferable to stack the layers so that two adjacent layers are in contact with one another.

The light transmissive multilayer stack 30 is supported by a support at a predetermined distance from the light source unit 10. The lower face 30b of the light transmissive multilayer stack 30 is preferably in contact with the ridges 15c of the dividing members 15. For example, the ridges 15c and the lower face 31b of the half mirror 31 may be bonded using bonding members, or the ridges 15c may be connected to the half mirror 31 or other member using pins, screws, or the like. With the structure that the ridges 15c are in contact with the lower face 30b of the light transmissive multilayer stack 30, the light emitted from the light source 20 in one emission space 17 can be less likely to enter an adjacent emission space 17.

The distance OD between the half mirror 31 and the mounting board 11 is preferably set to 0.2 times the arrangement pitch P for the light sources 20 at most (OD/P≤0.2). More preferably, the distance OD is set to in a range of 0.05 times to 0.2 times the arrangement pitch P for the light sources 20 (0.5≤OD/P≤0.2). With a conventional construction, setting the distance between the light transmissive multilayer stack 30 and the mounting board on which light sources 20 are mounted to be small caused considerable non-uniform in the luminance of the light emitting device. In contrast, in the light emitting device 101 according to this disclosure, the employment of the half mirror 31 and the diffuse reflectors 32 can achieve uniform luminance distribution.

The light emitting device 101 can be manufactured by individually providing a light source unit 10 and a light transmissive multilayer stack 30, and assembling the two by supporting the light transmissive multilayer stack 30 on the light source unit 10 using the aforementioned support.

Operation and Effect of the Light Emitting Device 101

The operation of the light emitting device 101, particularly the reason why the non-uniform luminance of the light emitted from the light sources 20 can be attenuated, will be explained. In the case where the light emitting device 101 is used as a surface emitting device such as a backlight, it is preferable to minimize the non-uniform luminance at the upper face 30a of the light transmissive multilayer stack 30, which is the emission face of the light emitting device 101.

However, because the light source 20 is a point light source, the illuminance of the surface illuminated by the light emitted from the light source 20 is inversely proportional to the square of the distance. For this reason, the illuminance of the light incident on the lower face 30b of the light transmissive multilayer stack 30 is higher in areas R1 that is immediately above the light source 20 in a top view than in areas R2 that are positioned in the periphery of R1. This is because the distance between the light source 20 and the upper face 30a in areas R1 is smaller than the distance between the light source 20 and the upper face 30a in areas R2.

In using the light emitting device 101 as a backlight, a reduction in the thickness or height is desirable because a thinner display device is in demand from the perspective of the design, beauty, and functionality of the display device. For this reason, the smaller the distance OD between the light source unit 10 and the light transmissive multilayer stack 30, the more preferable it is. A smaller OD would increase the light that directly enters the light transmissive multilayer stack 30. Thus, unless the intervals between the light sources 20 are reduced to the extent possible, the non-uniform luminance at the upper face 30a described above worsens.

The light emitting device 101 according to the present embodiment includes a half mirror 31 and diffuse reflectors 32. The half mirror 31 is positioned closer to the light sources 20 than the diffuse reflectors 32 are, and reflects portion of the light emitted from the light sources 20. The light reflected by the half mirror 31 enters the mounting board 11 that supports the light sources 20, and is reflected at the mounting board 11 side to enter the half mirror 31 again. The reentering light which has been reflected by the half mirror 31 and at the mounting board 11 side is more diffused than the light that directly enters from the light sources 20. Thus, by allowing portion of the light emitted from the light sources 20 to be reflected between the half mirror 31 and the mounting board 11 once or multiple times, the light from the light sources 20 can be released from a larger area than the emission faces of the light sources 20, in other words, the light from the light sources 20 can be output planarly from the half mirror 31.

The light released from the half mirror 31 is incident on and scattered by the diffuse reflectors 32 positioned at least above the emission faces 21a of the light sources 20. This can selectively diffuse the high luminous flux density light near the optical axes L of the light sources 20 thereby attenuating the non-uniform luminance.

In the case of constructing the half mirror 31 with a dielectric multilayer film, in particular, the absorption of light by the half mirror 31 can be reduced, and thus the use efficiency of light can be increased. The reflectance of the half mirror 31 in the perpendicular direction is substantially uniform. This property can be achieved by stacking dielectric films, and a large area half mirror 31 can be produced relatively easily and inexpensively by using, for example, display panel production technology. Accordingly, a half mirror 31 having good properties can be produced inexpensively, and the production costs of the light emitting device can be reduced.

Setting the reflectance of the half mirror 31 to be lower for oblique incidence than perpendicular incidence allows the half mirror to reflect more light that is directly incident on the half mirror in the optical axis L direction of the light source 20 and reflect less light that is directly incident on the half mirror 31 at a larger angle relative to the optical axis L of the light source 20. This is particularly effective in reducing the non-uniform luminance attributable to the direct light from the light sources 20.

Each diffuse reflector 32, which includes a resin and particles dispersed in the resin, may be arranged such that the density of the particles in the first portion 32a directly above the emission face of each light source when viewed from the top is higher than the density of the second portion 32b positioned in the periphery of the first portion 32a. This can provide different degrees of scattering within each diffuse reflector 32, in other words, increasing scattering in the higher luminous flux density area, thereby further attenuating the non-uniform luminance.

The diffuse reflectors 32 may be disposed on the upper 31a of the half mirror 31 or the lower face 33b of the light diffusion plate 33. In the case where the linear expansion coefficient of the half mirror 31 is smaller than the linear expansion coefficient of the light diffusion plate 33, and the linear expansion coefficient difference between the mounting board 11 and the light diffusion plate 33 is smaller than the linear expansion coefficient difference between the mounting board 11 and the half mirror 31, the diffuse reflectors 32 may be disposed on the half mirror 31. In this case, misalignment between the light sources 20 and the diffuse reflectors 32 attributable to thermal expansion/contraction can be reduced. This thus can produce a light emitting device 101 with small optical characteristic changes attributable to the heat generated during operation.

In general, the reflectance bandwidth of a half mirror shifts to the shorter wavelength side for obliquely incident light as compared to light perpendicularly incident on the half mirror. For this reason, by designing the reflectance characteristics of the half mirror 31 in the perpendicular direction such that the reflectance bandwidth on the longer wavelength side from the peak emission wavelength of the light sources 20 is broader than that on the shorter wavelength side, a reduction of the reflectance which can emphasize the luminance non-uniformity can be attenuated even if the reflectance spectrum of the half mirror shifted to the shorter wavelength side for the light that is incident slightly obliquely relative to the optical axis.

Furthermore, by providing the light sources 20 with batwing type light distribution characteristics, the illuminance at areas R1 in FIG. 1 can be reduced. This can further attenuate the non-uniform luminance at the upper face 30a of the light transmissive multilayer stack 30 that is the emission face of the light emitting device 101. When the light sources 20 have the light distribution characteristics where the quantity of light less than the elevation angle of 20° relative to the lateral direction is at least 30% of the total quantity of light, in particular, the non-uniform luminance can be further attenuated. As described above, the light emitting device 101 according to the present disclosure can effectively attenuate the non-uniform luminance at the upper face 30a of the light transmissive multilayer stack 30 which is the emission face of the light emitting device 101.

Figure 13:
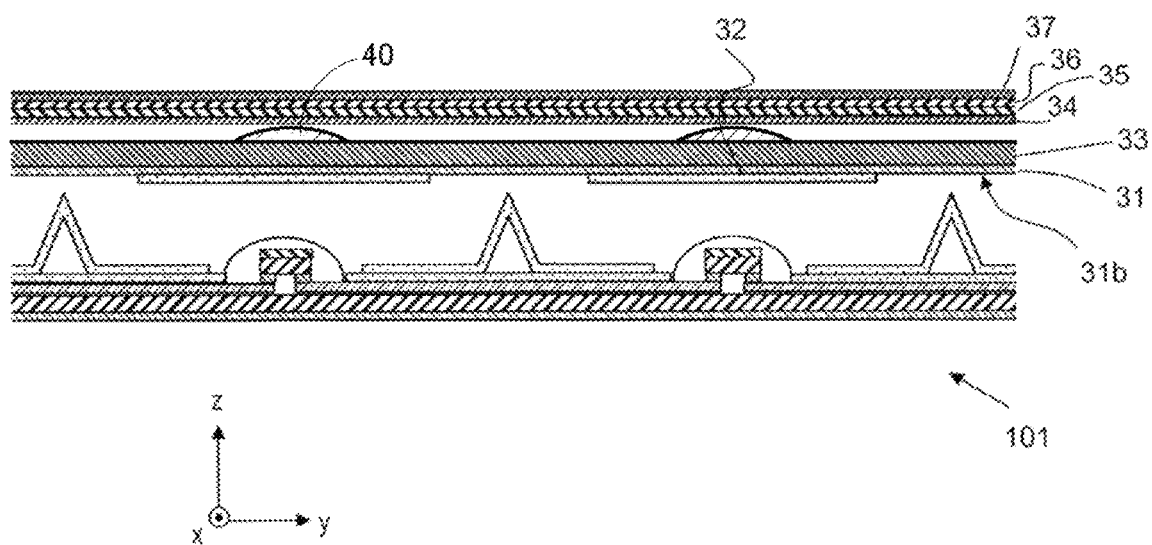
FIG. 13 is a cross-sectional view of still another example of the light emitting device according to an embodiment.

Furthermore, the light transmissive multilayer stack 30 may include one or more light absorbing layers 40 located at least above the light emission surface of the plurality of light sources. The light absorbing layers 40 absorbs at least a part of the light emitted from the light sources. In the case where white light is obtained by a combination of the semiconductor light emitting element and the cover member including the wavelength conversion member, the luminous intensity of may be high in a region where the absolute value of the light distribution angle is close to 0 compared a region where to the absolute value of the light distribution angle is greater. Consequently, wavelength conversion by the wavelength conversion member is not sufficiently performed in some cases. For example, when the light sources including the semiconductor light emitting element that emits blue light and a cover member that includes the wavelength conversion member that converts blue light into yellow light is used, bluish color may appear on the display surface directly above each light source in some cases. That is, color non-uniformity sometimes occurs. Also in the configuration of such the light sources, by disposing the light absorption layer 40 above the light emission surface of the light source, the blue light emitted at the light distribution angle close to 0° can be selectively absorbed by the light absorption layer 40. Therefore, color non-uniformity can be less likely to occur. In the FIG. 13, the light absorption layer 40 is formed on the upper surface of the light diffusion plate 33.

EXAMPLE

A light emitting device 101 was produced and its luminance distribution was observed as explained below. For the light sources 20, those including nitride-based blue light emitting elements 21 and cover members 22 and light source having batwing type luminous intensity distribution characteristics were used.

For the half mirror 31, PICASUS 100GH10 having a 50% transmittance manufactured by Toray Industries, Inc. was used. For the light diffusion plate 33, a light diffusion sheet was used. For the wavelength conversion layer 34, a phosphor sheet containing a green phosphor and a red phosphor was used. For prism array layers 35 and 36, prism sheets were used, which were arranged so that the prism extending directions were orthogonal to one another. For the reflective polarizing layer 37, a reflective polarizing film was used. For the diffuse reflectors 32, a white ink composed of a resin in which titanium oxide particles were dispersed was printed on the lower face 33b of the light diffusion plate 33 using an inkjet printer. The light sources 20 were arranged in five rows and five columns at a pitch P of 18.8 mm. The distance OD between the mounting board 11 and the half mirror 31 was set to 1.8 mm. OD/P was 0.096.

For comparison purposes, a light emitting device was produced without a half mirror 31, and by setting the distance OD between the mounting board 11 and the diffusion plate 33 to 3.8 mm (hereinafter referred to as the Reference Sample). OD/P was 0.20.

Figure 12:
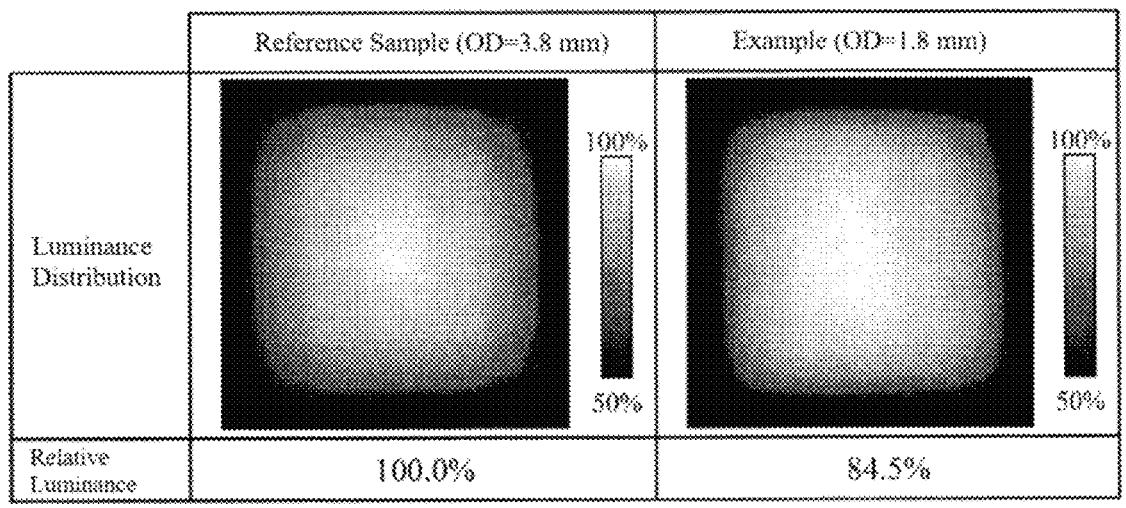
FIG. 12 is a chart comparing the luminance distribution of an example and a reference sample.

The light emitting devices of the Example and the Reference Sample were turned on, and the emission faces were photographed as shown in FIG. 12. As is understood from FIG. 12, by employing the half mirror 31 and the diffuse reflectors 32, it was possible to achieve luminance distribution characteristics having equivalent or better luminance non-uniform attenuation as compared to the Reference Sample that had no half mirror 31 and OD set to 3.8 mm. In other words, even when the distance OD between the mounting board 11 and the half mirror 31 is reduced to one half of that of the Reference Sample or smaller, a light emitting device having equivalently or more uniform luminance distribution can be realized.

When the relative luminance was measured, the luminance of the light emitting device of the Example was about 85% of that of the Reference Sample. This is believed to be because the insertion of the half mirror 31 slightly reduced the light extraction efficiency.

It is understood from these results that the light emitting device according to the present disclosure can achieve uniform luminance distribution with reduced luminance non-uniformity even when the distance between the half mirror and the mounting board is 0.2 times the distance between two adjacent light sources or smaller.

The light emitting device according to the present disclosure can be utilized as a backlight light source for a liquid crystal display, various types of lighting fixtures, or the like.

What is claimed is:

1. A light emitting device comprising:
   a mounting board;
   a plurality of light sources positioned on the mounting board;
   a light diffusion plate;
   a half mirror positioned between the light diffusion plate and the plurality of light sources; and
   a plurality of diffuse reflectors positioned between the mounting board and the light diffusion plate, and above at least part of each emission face of the plurality of light sources, wherein:
   the diffuse reflectors comprise a resin, and particles dispersed in the resin,
   each of the diffuse reflectors is positioned in an area that, in the top view, is larger than and includes the emission face of each light source, and
   a density of the particles in said area, in the top view, is higher in a first portion located immediately above the emission face of each light source than in a second portion located around a periphery of the first portion.

2. The light emitting device according to claim 1, wherein:
   the diffuse reflectors are positioned on the upper face or the lower face of the half mirror.

3. The light emitting device according to claim 1, wherein:
   the diffuse reflectors are positioned on the lower face of the light diffusion plate.

4. The light emitting device according to claim 1, further comprising:
   a plurality of dividing members defining a plurality of regions,
   wherein each dividing member comprises a wall portion forming a ridge, and
   wherein each dividing member surrounds a respective one of the plurality of light sources on the mounting board.

5. The light emitting device according to claim 4, wherein:
   the diffuse reflectors are not positioned above the ridges of the dividing members.

6. The light emitting device according to claim 4, wherein:
   the half mirror is in contact with one or more of the ridges of the dividing members.

7. The light emitting device according to claim 4, wherein the half mirror is secured to one or more of the ridges of the dividing members via a bonding member.

8. The light emitting device according to claim 1, wherein:
   each light source has a batwing type luminous intensity distribution characteristic.

9. The light emitting device according to claim 1, wherein:
   the half mirror comprises a dielectric multilayer film.

10. The light emitting device according to claim 1, wherein:
    perpendicular direction reflectance characteristics of the half mirror are such that a bandwidth on a longer wavelength side of a peak emission wavelength of the light sources is broader than a bandwidth on a shorter wavelength side of a peak emission wavelength of the light sources.

11. The light emitting device according to claim 1, wherein:
    a reflectance of the half mirror for emission wavelengths of the light sources when perpendicularly incident is in a range of 30% to 75%.

12. The light emitting device according to claim 1, wherein:
    a distance between the half mirror and the mounting board is at most 0.2 times an interval between two adjacent light sources.

13. The light emitting device according to claim 1, wherein:
    each light source has a luminous intensity distribution characteristic such that a light amount under an elevation angle of 20° relative to a lateral direction is at least 30% of a total amount of light from the light source.

14. The light emitting device according to claim 1, further comprising:
    a wavelength conversion layer positioned on a side of the light diffusion plate opposite the half mirror, the wavelength conversion layer being adapted to absorb light from the light sources and emit light having wavelengths that are different from emission wavelengths of the light sources.

15. The light emitting device according to claim 14, further comprising:
    a dichroic layer positioned between the wavelength conversion layer and the half mirror, and having a higher reflectance for the wavelengths of the light emitted from the wavelength conversion layer than that for the emission wavelengths of the light sources.

* * * * *